United States Patent
Park

(10) Patent No.: US 11,503,847 B2
(45) Date of Patent: Nov. 22, 2022

(54) **METHOD FOR CO-CULTURING *INONOTUS OBLIQUUS*, *GANODERMA LUCIDUM*, AND *PHELLINUS LINTEUS* MYCELIA**

(71) Applicant: GIUNCHAN CO., LTD., Cheonan-si (KR)

(72) Inventor: Jong-Yea Park, Cheonan-si (KR)

(73) Assignee: GIUNCHAN CO., LTD., Cheonana-si (KR)

( * ) Notice: Subject to any disclaimer, the term of this patent is extended or adjusted under 35 U.S.C. 154(b) by 99 days.

(21) Appl. No.: 16/978,936

(22) PCT Filed: Nov. 14, 2018

(86) PCT No.: PCT/KR2018/013911
§ 371 (c)(1),
(2) Date: Sep. 8, 2020

(87) PCT Pub. No.: WO2019/177221
PCT Pub. Date: Sep. 19, 2019

(65) Prior Publication Data
US 2021/0360953 A1 Nov. 25, 2021

(30) Foreign Application Priority Data
Mar. 13, 2018 (KR) .................. 10-2018-0029364

(51) Int. Cl.
| | | |
|---|---|---|
| *A01G 18/00* | (2018.01) | |
| *A23L 13/00* | (2016.01) | |
| *A23L 13/40* | (2016.01) | |
| *A23L 27/00* | (2016.01) | |
| *A23L 13/70* | (2016.01) | |
| *A23L 27/10* | (2016.01) | |
| *A23L 31/00* | (2016.01) | |
| *A01G 18/20* | (2018.01) | |
| *A22C 9/00* | (2006.01) | |

(52) U.S. Cl.
CPC .............. *A23L 13/46* (2016.08); *A01G 18/20* (2018.02); *A22C 9/00* (2013.01); *A23L 13/72* (2016.08); *A23L 27/10* (2016.08); *A23L 27/88* (2016.08); *A23L 31/00* (2016.08); *A23V 2002/00* (2013.01)

(58) Field of Classification Search
CPC ........ A01G 18/00; A01G 18/10; A01G 18/20; A01G 18/40; A01G 18/50; A01G 18/70; A23B 4/14; A23B 4/20; A23B 4/22; A23L 27/26; A23L 31/00; A23L 33/00; A61K 36/07; A61K 36/00; A61K 36/06; A61K 36/074; C12N 1/14; C12N 1/145
See application file for complete search history.

(56) References Cited

U.S. PATENT DOCUMENTS

2009/0148559 A1* 6/2009 Noordam ................ A23L 27/23
435/270

FOREIGN PATENT DOCUMENTS

| KR | 10-2003-0028638 A | 4/2003 | |
|---|---|---|---|
| KR | 10-2007-0045546 A | 5/2007 | |
| KR | 10-2009-0022274 A | 3/2009 | |
| KR | 10-0922311 B1 | 10/2009 | |
| KR | 10-2011-0004219 A | 1/2011 | |
| KR | 10-1358648 * | 2/2014 | ............ A01G 18/00 |
| KR | 10-1358648 B1 | 2/2014 | |
| KR | 10-1652035 B1 | 8/2016 | |
| KR | 10-1810410 B1 | 12/2017 | |

OTHER PUBLICATIONS

Cook, Fungal ripened meatsand meat products, chapters, 5. Campbell-Platt et al (eds), Fermented Meats, (c) Springer Science+ Business Media Dordrecht, 1995, 110-129 (Year: 1995).*
Rosin Cerate Quirky quality science, "What we know about fungi and cured meats", Sep. 24, 2015, downloaded from http://www.rosincerate.com/2015/09/what-we-know-about-fungi-and-cured-meats.html (Year: 2015).*
Shen et al, Antimicrobials from mushrooms for assuring food safety, Comprehensive Reviews in Food Science and Food Safety, vol. 00, 1-14, downloaded from https://www.researchgate.net/publication/313537574_Antimicrobials_from_Mushrooms_for_Assuring_Food_Safety_Antimicrobials_from_mushrooms, Feb. 2017 (Year: 2017).*
Glamočlija et al (Chemical characterization and biological activity of Chaga (*Inonotus obliquus*), a medicinal "mushroom", Journal of Ethanopharmacology 162 (2015) 323-332 (Year: 2015).*
Korean Notification of Reason for Refusal for 10-2018-0029364 dated Apr. 17, 2018.
International Search Report for PCT/KR2018/013911 dated, Feb. 11, 2019 (PCT/ISA/210).

* cited by examiner

*Primary Examiner* — Anne Marie Grunberg
(74) *Attorney, Agent, or Firm* — Sughrue Mion, PLLC

(57) ABSTRACT

The present invention relates to a method of co-culturing *Inonotus obliquus*, *Ganoderma lucidum*, and *Phellinus linteus*. The co-cultured mycelia prepared through the method of the present invention have high beta-glucan content and thus can exhibit superior health functionality, and can be used as an additive or a cooking seasoning in various foods. In addition, the use of the co-cultured mycelia in curing raw meat enables easy preparation of a meat-based food product that has a good taste and flavor.

8 Claims, No Drawings

METHOD FOR CO-CULTURING *INONOTUS OBLIQUUS*, *GANODERMA LUCIDUM*, AND *PHELLINUS LINTEUS* MYCELIA

CROSS REFERENCE TO RELATED APPLICATIONS

This application is a National Stage of International Application No. PCT/KR2018/013911 filed Nov. 14, 2018, claiming priority based on Korean Patent Application No. 10-2018-0029364, filed Mar. 13, 2018, the entire disclosures of which are incorporated herein by reference.

TECHNICAL FIELD

The present invention relates to a method of co-culturing *Inonotus obliquus*, *Ganoderma lucidum* and *Phellinus linteus* mycelia.

BACKGROUND ART

*Inonotus obliquus* is a fungal parasite on birch trees, alder trees and the like that grow wild in cold regions such as Russia, Canada, and Hokkaido, Japan. Recently, in Japan, *Inonotus obliquus* has been reported to be effective at preventing hepatitis C and treating liver cancer, and in the United States, *Inonotus obliquus* is classified as a special natural substance and is being developed as a future pharmaceutical and health food. Based on the results of use of *Inonotus obliquus* in patients with gastric cancer and diabetes in the private sector in Korea, it has been reported that the effects thereof are superior to those of other mushrooms. In addition, it has been reported that *Inonotus obliquus* is effective at increasing body immunity, suppressing tumor occurrence, and whitening the skin.

*Phellinus linteus*, also referred to as "wood mud mushroom", is recorded by the name "sangmokyi" in the Decoction Section of the "Donguibogam" literature. It grows wild on mulberry trunks and is all yellow except for the surface of the mushroom. In the beginning, it appears similar a lump of mud, but after it has grown, it grows into the form of a tongue protruding from a tree stump, and in this form is also referred to the word "suseol". From old times, *Phellinus linteus* has been used to treat uterine bleeding, menstrual irregularity and the like, and recently, it has been reported that it has excellent effects on tumor suppression, immunity strengthening and whitening.

*Ganoderma lucidum* grows in the roots of broad-leaved trees in the summer. It is also known as Qin Shi Huang's Bullocho, and in the "Bonchogangmok" literature, this mushroom is classified as a high-class medicine, along with ginseng. *Ganoderma lucidum* is known to be effective for respiratory diseases, nervous breakdowns, heart disease, high blood pressure, etc. because it has a tonicity effect, an antitussive effect, and an antitumor effect. It is also known to lower cholesterol and have anticancer effects.

Meanwhile, in order to use the above mushrooms as a mixed raw material for pharmaceuticals and functional foods, mushroom fruit bodies have to be harvested and used, but there are problems that mushrooms themselves do not reproduce well in the natural state and also that resource depletion and ecosystem destruction are caused by abuse of harvesting. Methods of cultivating fruit bodies using sawdust or the like are also used, but these methods take several months only for the cultivation period. Therefore, the massive production facilities that would be required in order to meet the demand for mass production for industrial use would be prohibitively expensive. As described above, although the mushrooms are effective as anticancer agents or immune-enhancing agents, the supply thereof is limited and mass production and rapid production are not easy, so they are not widely utilized. Accordingly, with regard to the above mushrooms, thorough research is recently ongoing into mass cultivation methods capable of producing mushroom mycelia having effects equivalent to those of the fruit bodies of mushroom fungi.

Korean Patent No. 10-0922311 discloses a method of co-culturing *Inonotus obliquus*, *Phellinus linteus*, *Ganoderma lucidum*, *Sparassis crispa* and *Cordyceps militaris* mycelia, Korean Patent No. 10-1358648 discloses a method of co-culturing *Inonotus obliquus*, *Phellinus linteus* and *Ganoderma lucidum*, and Korean Patent No. 10-1652035 discloses a method of culturing complex mushroom mycelia of *Inonotus obliquus*, *Phellinus linteus* and *Sparassis crispa*. However, the co-cultured mycelia differ in the innate enzyme activity or beta-glucan content thereof depending on the culture conditions thereof, and different tastes and flavors may be produced even when food is processed using the same.

In order to improve the softness of edible meat, herbs, spices, wine, vinegar, pear juice, radish juice, etc. have been traditionally used, but from the aspects of the preparation process or product characteristics, the actual application thereof at the processing plant level has many problems, and so far, this method has been partially used in the preparation of seasoned meat, and thus has not been widely adopted in manufacturing processed meat products.

Curing is a process of soaking raw meat for a predetermined period of time in a curing agent including salt, nitrite, a meat color fixing agent, a curing accelerator, and polyphosphates (such as sodium pyrophosphate) as a binding reinforcing agent, along with various seasonings (sodium glutamate), spices, sweeteners, emulsion stabilizers (sodium caseinate), pH adjusters (citric acid, etc.), binders (wheat protein, etc.) or preservatives (sorbic acid, etc.). Curing is distinguished from salting in which salt alone is used. It is an important and essential process for meat processing because there are many factors that determine product quality. As an effect caused by the curing, a salty taste is imparted, and thus the proliferation of microorganisms is suppressed, the preservation capability is increased, and the taste is improved. Moreover, since myosin and actomyosin are extracted from myofibrils and thus water is retained in the network structure due to the heat-induced gel formation, the binding properties and water retention properties are increased, and a unique cured-meat color is created. Furthermore, the growth of botulinum bacteria is suppressed through curing, which prevents botulinum poisoning, and also, a desirable flavor peculiar to cured meat is formed, and oxidation of fat is suppressed. Hence, curing is regarded as the most important step in meat processing.

A curing process mainly includes a dry curing process and a wet curing process. Dry curing is the oldest curing method, and is a method of uniformly applying a curing agent composed of salt, sugar, nitrate or nitrite evenly on the surface of raw meat, followed by a soaking process. Specifically, the broth comes out from the meat to the surface of the meat due to the osmotic action of the salt, and a brine is formed by itself while the curing agent is dissolved in the broth, which is collected and poured again onto the upper portion of the meat. The curing period usually takes several days to several weeks. The dry curing process is used to produce expensive products such as raw ham, bone-in ham, bacon and the like, and the broth is extracted from the meat and the water content thereof is reduced, whereby the tissue becomes hard and storage stability increases, but the yield is low, productivity is low, and the curing period is long.

Wet curing is mainly used in manufacturing a cooked ham by dissolving salt and other curing agents in water to make a brine and allowing the brine to penetrating into the meat. The salt concentration of the brine is appropriately 15-20%, but may be adjusted depending on the amount of the brine that is injected. Ascorbate is added during brine production. When ascorbate comes into contact with nitrite, a chemical reaction occurs and nitrogen monoxide (NO) gas is produced in a short time, and this gas reacts with myoglobin, which is a meat pigment, and is then converted into nitrosomyoglobin. Examples of the wet curing process include brine soaking, in which meat is soaked in brine for a long time, and pickle injection, in which brine is injected into muscle tissue using a syringe. There are two types of pickle injection: artery injection, in which brine is injected into blood vessels to uniformly spread the brine in muscles through the blood vessels, and muscle injection, in which brine is directly injected into muscles. In the artery injection method, the destruction of muscle tissue may be prevented, the curing speed is fast, the taste is uniform, and the flavor is good, but the productivity is low, so mass production is impossible, and it is used only for high-quality handmade products. The muscle injection method is performed using a brine injector or an automatic multiple-needle injector.

Meanwhile, when the meat is cured, the taste is improved compared to that of uncured meat, and the meat quality is softened, and moreover, the commercial value of the meat is improved, and thus preference for cured meat over unprocessed meat has recently increased. However, among the ingredients mainly added to the curing agent, nitrite is a synthetic food additive and is known to be dangerous when ingested in excess. Moreover, even in the case in which sodium glutamate is used as a curing-agent additive, it is known to destroy nerve cell membranes when excess glutamic acid as an excitatory neurotransmitter is absorbed into nervous tissue. In particular, it is reported that the cerebrum of infants, unlike adults, has the potential to destroy the pituitary gland even in the presence of a very small amount thereof, and also that abnormalities in general metabolism as well as growth may be caused. In addition, it has been reported that sodium glutamate may act as the cause of acidemia, thus preventing the absorption of calcium in the kidneys and releasing calcium from the bones, resulting in osteoporosis, and there is a lot of controversy about the risk thereof.

Therefore, in modern society, in which various food additives are excessively used and awareness of the dangers that may arise therefrom is increasing, the development of a novel curing agent or curing method that is beneficial to health and may create a taste equal to or superior to that of conventional curing agents is urgently required.

Accordingly, the present inventors have ascertained that cured meat is capable of being prepared using co-cultured mycelia of *Inonotus obliquus, Ganoderma lucidum* and *Phellinus linteus*, obtained through a novel co-culturing method, thereby making it possible to manufacture a processed meat-based food product having excellent taste and flavor, thus culminating in the present invention.

CITATION LIST (Patent Document 1) Korean Patent No. 10-1358648 (Title: Method of co-culturing *Inonotus obliquus, Phellinus linteus* and *Ganoderma lucidum* using mushroom extract, Applicant: Lee Tae-Bong, Registration date: Jan. 28, 2014)

(Patent Document 2) Korean Patent No. 10-1652035 (Title: Method of producing complex mushroom mycelia of *Inonotus obliquus, Phellinus linteus* and *Sparassis crispa*, Applicant: Giunchan Co. Ltd., Registration date: Aug. 23, 2016)

DISCLOSURE

Technical Problem

An objective of the present invention is to provide a method of co-culturing *Inonotus obliquus, Ganoderma lucidum* and *Phellinus linteus* mycelia.

Technical Solution

The present invention provides a method of co-culturing *Inonotus obliquus, Ganoderma lucidum* and *Phellinus linteus* mycelia.

Preferably, the present invention provides a method of co-culturing *Inonotus obliquus, Ganoderma lucidum* and *Phellinus linteus* mycelia, including:

(first step) inoculating a fruit body tissue of each of *Inonotus obliquus, Ganoderma lucidum* and *Phellinus linteus* in PDA (Potato Dextrose Agar) and then separately culturing mycelia of each mushroom;

(second step) co-inoculating mycelia of three species of the *Inonotus obliquus, Ganoderma lucidum* and *Phellinus linteus* separately cultured in the first step in PDB (Potato Dextrose Broth);

(third step) culturing the PDB (Potato Dextrose Broth) inoculated with the mycelia of three species for 4-6 weeks;

(fourth step) inoculating the mycelia obtained through culturing in the third step in a rice barley medium; and (fifth step) further culturing the mycelia inoculated in the rice barley medium in the fourth step for 4-7 weeks to afford co-cultured mycelia.

Here, the culturing the mycelia in the third step is preferably performed at 25-30° C. and a relative humidity of 10-30%. Furthermore, for the initial 1-2 weeks, stationary culture is performed, during which stirring is preferably conducted once or two times for 1-5 min every day, after which shaking culture with stirring at 50-150 rpm is performed, which is beneficial for the culture of mycelia.

The rice barley medium in the fourth step may be obtained by subjecting rice barley to soaking for 4-8 hr and then dehydration, adding calcium carbonate in an amount of 0.5-2 parts by weight based on 100 parts by weight of the dehydrated rice barley, and then performing sterilization at 120-125° C. for 30 min to 2 hr.

The culturing in the fifth step is preferably performed at 25-30° C. and a relative humidity of 40-60%.

In addition, the present invention provides a method of curing raw meat using co-cultured mycelia of *Inonotus obliquus, Ganoderma lucidum* and *Phellinus linteus*, including:

obtaining the co-cultured mycelia as described above and (sixth step) finely cutting the co-cultured mycelia isolated from the rice barley medium, adding the finely cut co-cultured mycelia, along with cumin powder, basil powder, dill weed powder, dill seed powder and salt, to the meat, and performing curing.

In the sixth step, the meat may be added with, based on 100 parts by weight of the raw meat, 1-5 parts by weight of the co-cultured mycelia, 0.1-0.3 parts by weight of the cumin powder, 0.1-0.3 parts by weight of the basil powder, 0.1-0.3 parts by weight of the dill weed powder, 0.1-0.3 parts by weight of the dill seed powder and 0.01-0.1 parts by weight of the salt, after which the meat added with the mycelia and various herbs such as cumin powder and the like is preferably cured through room-temperature storage at 23-27° C. for 3-5 hr and then low-temperature treatment at 5-10° C. for 24-48 hr.

The raw meat may be selected from among pork, beef, duck, chicken, turkey, pheasant, quail, goat and mutton.

In addition, the present invention provides *Inonotus obliquus, Ganoderma lucidum* and *Phellinus linteus* mycelia obtained through the above co-culturing method. In addition, a curing-agent composition for meat containing the above mycelia, cumin powder, basil powder, dill weed powder, dill seed powder and salt may be provided.

Hereinafter, a detailed description will be given of the present invention.

In the present invention, PDA (Potato Dextrose Agar) used in the culture of mushroom mycelia may be prepared by sterilizing 3-5 g of potato starch, 10-30 g of dextrose, and 10-30 g of agarose based on a total volume of 1 t thereof. Here, water may be added in the remaining amount such that the total volume is 1 t. The sterilization is preferably performed at a temperature of at least 120-125° C. for 15-20 min. Most preferably, PDA (Potato Dextrose Agar) is prepared by adding 4 g of potato starch, 20 g of dextrose and 15 g of agarose with water in an amount such that the total volume is 1 f, followed by sterilization.

Also, in the present invention, PDB (Potato Dextrose Broth) used in the culture of mushroom mycelia may be prepared by further adding water in lieu of agarose in the process of preparation of PDA (Potato Dextrose Agar). Most preferably, PDB (Potato Dextrose Broth) is prepared by adding 4 g of potato starch and 20 g of dextrose with water in an amount such that the total volume is 1 t, followed by sterilization.

When respective mushroom fruit bodies are separately cultured in the first step, it is preferred that individual mushroom fruit body pieces be inoculated in PDA (Potato Dextrose Agar) and then cultured at 25-30° C. for 1-3 weeks. Here, the culture period may be appropriately adjusted in the range of 1-3 weeks depending on the rate of growth of the mushroom fruit body. Also, the relative humidity upon culture under the above conditions may be 10-60%. If the humidity is less than 10% or exceeds 60%, the growth of the mycelia may be slowed.

If the culture period is less than 1 week, the mycelia may not grow to an extent sufficient for activating the subsequent liquid culture. On the other hand, if the culture period exceeds 3 weeks, the mycelia may not be cultured well during the subsequent liquid culture. Also, the culture temperature, which is lower than 25° C. or exceeds 30° C., may affect the culture of the mycelia upon liquid culture, which is undesirable.

When the mycelia of three species are co-inoculated in PDB (Potato Dextrose Broth) in the second step, or when the mycelia of each mushroom cultured in the first step are co-inoculated therein, the mycelia may be inoculated in similar predetermined amounts, but more preferably, individually cultured mycelia are cut to 0.5-2 mm$^2$ and 3-7 pieces of each of the mycelia of three species of mushrooms are co-inoculated in PDB (Potato Dextrose Broth).

The culture of the mycelia in the third step is preferably performed at 25-30° C. If the culture temperature is lower than 25° C., the mycelia may not grow well. On the other hand, if the culture temperature exceeds 30° C., the culture of the mycelia may also be slowed. Moreover, for the initial 1-2 weeks, stationary culture is carried out, during which stirring is preferably performed once or two times for 1-5 min every day, after which shaking culture with stirring at 50-150 rpm is performed, which is beneficial for the culture of mycelia. Here, the relative humidity upon culture under the above conditions is not particularly limited, but preferably the relative humidity is 10-30%.

Based on 1 kg of the rice barley medium in the fourth step, the mycelia obtained through the culture of the third step may be inoculated in an amount of 1-10 ml in a culture broth state. Here, if the mycelial broth is inoculated in an amount less than 1 ml, additional culture in the rice barley medium may not occur. On the other hand, if the mycelial broth is inoculated in an amount greater than 10 ml, the culture is not further activated, which is undesirable.

The rice barley medium in the fourth step may be obtained by subjecting rice barley to soaking for 4-8 hr and then dehydration, adding calcium carbonate in an amount of 0.5-2 parts by weight based on 100 parts by weight of the dehydrated rice barley, and then performing sterilization at 120-125° C. for 30 min to 2 hr. Here, if the rice barley is not sufficiently soaked in water for a period of time less than 4 hr, water content may be insufficient during culture of the mycelia, and rice barley may not be well used as a nutrient source. On the other hand, if the rice barley is soaked for a period of time exceeding 8 hr, additional water is not absorbed by the rice barley, so the preparation time may be prolonged, which is undesirable.

The culturing in the fifth step is preferably carried out at 25-30° C. If the culture temperature is lower than 25° C., the mycelia may not grow well. On the other hand, if the culture temperature exceeds 30° C., the culture of the mycelia may also be slowed. Also, the relative humidity upon culture under the above conditions may be 40-60%. If the humidity is lower than 40% or higher than 60%, the growth of the mycelia may be slowed.

In the sixth step, the meat may be added with, based on 100 parts by weight of raw meat, 1-5 parts by weight of the co-cultured mycelia, 0.1-0.3 parts by weight of cumin powder, 0.1-0.3 parts by weight of basil powder, 0.1-0.3 parts by weight of dill weed powder, 0.1-0.3 parts by weight of dill seed powder and 0.01-0.1 parts by weight of salt, after which the meat added with the mycelia and various herbs such as cumin powder and the like is preferably cured through room-temperature storage at 23-27° C. for 3-5 hr and then low-temperature treatment at 5-10° C. for 24-48 hr. Here, when the process of storage at room temperature is omitted during the curing process, the activity of the co-cultured mycelia is not exhibited, and the odor may not be removed from the meat.

In the present invention, the co-cultured mycelia of *Inonotus obliquus, Ganoderma lucidum* and *Phellinus linteus*, obtained through the method of co-culturing *Inonotus obliquus, Ganoderma lucidum* and *Phellinus linteus*, may be dried in the state of containing the rice barley medium therein, and then powdered, thereby obtaining a co-cultured mycelial powder, and the co-cultured mycelial powder may be used as a food additive such as a cooking seasoning or the like.

Advantageous Effects

The present invention pertains to a method of co-culturing *Inonotus obliquus, Ganoderma lucidum* and *Phellinus linteus*, and the co-cultured mycelia thus obtained has high beta-glucan content and thus can exhibit superior health functionality, and can be used as an additive or a cooking seasoning in various foods. In addition, the use of the co-cultured mycelia in curing raw meat enables easy preparation of a meat-based food product that has a good taste and flavor.

MODE FOR INVENTION

A better understanding of the present invention will be obtained through the following examples. However, the present invention is not limited to these examples, and may be embodied in other forms. These examples are provided to thoroughly explain the invention and to sufficiently transfer the spirit of the present invention to those skilled in the art.

Example 1. Co-Culture of *Inonotus obliquus*, *Ganoderma lucidum* and *Phellinus linteus* Mycelia The fruit body tissues of *Inonotus obliquus*, *Ganoderma lucidum*, and *Phellinus linteus* were isolated and then inoculated in PDA, after which the mycelia of each mushroom were cultured at 27-29° C. for 2 weeks. PDB medium subdivided into 100 mt units was prepared, individual mushroom mycelia cultured in PDA were cut to 1 mm$^2$ with a scalpel, and 5 pieces of each of the three species of strains that were cut were co-inoculated in each Erlenmeyer flask containing the PDB medium.

The co-inoculated medium was subjected to stationary culture in a BOD incubator (Bio-Oxygen Demand incubator, low-temperature incubator) at 27-28° C. and a humidity of 20% for 1 week. Here, stirring was performed for about 1 min every day during the culture. After 1 week, the flask that was cultured after co-inoculation was transferred to a shaking incubator and then culture was performed at 27° C. and 100 rpm for 4 weeks, thus preparing a co-cultured mycelial broth.

Rice barley was soaked for 6 hr and then dehydrated for 8 hr, after which 1 g of calcium carbonate was added based on 100 g of the dehydrated rice barley, followed by homogeneous mixing and sterilization using a high-pressure sterilizer at 121° C. for 1 hr, thereby preparing a rice barley medium. After termination of sterilization, 5 mf of the co-cultured mycelial broth, obtained through culturing for 5 weeks, was aliquoted and inoculated per kg of the rice barley medium cooled to 25° C. After inoculation, culture was performed for 30 days in a culture room maintained at a temperature of 26-28° C. and a humidity of 45-50%.

After completion of culture, some of the co-cultured mycelia were dried at 57-60° C. for 24 hr using a dryer in the state in which the rice barley was included therein, and were pulverized using a pin mill, thus obtaining a powder.

The co-cultured mycelia that were not powdered were left behind for use as a raw-meat curing agent by removing the rice barley medium therefrom and finely cutting only the mycelia.

Example 2. Preparation of Cured Meat Using Co-Cultured Mycelia 100 g of pork fillet, and appropriate amounts of the finely cut co-cultured mycelia remaining in Example 1, cumin powder, basil powder, dill weed powder, dill seed powder and salt were mixed to homogeneity, stored at room temperature of 25° C. for 4 hr, and then allowed to stand in a low-temperature warehouse at 7° C. for 24 hr, thereby preparing cured meat.

TABLE 1

| Preparation conditions of cured meat | Weight (g) | | | | | | |
|---|---|---|---|---|---|---|---|
| | Pork fillet | Co-cultured mycelia of Example 1 | Cumin powder | Basil powder | Dill weed powder | Dill seed powder | Salt |
| Example 2-1 | 100 | 1.0 | 0.2 | 0.2 | 0.2 | 0.2 | 0.1 |
| Example 2-2 | 100 | 1.0 | 0.1 | 0.3 | 0.1 | 0.3 | 0.1 |
| Example 2-3 | 100 | 1.0 | 0.3 | 0.1 | 0.3 | 0.1 | 0.1 |
| Example 2-4 | 100 | 5.0 | 0.1 | 0.1 | 0.1 | 0.1 | 0.1 |

Comparative Example 1. Preparation of Comparative Mycelia—i

The mycelia were prepared under respective conditions as shown in Table 2 below.

TABLE 2

| Conditions | Features |
|---|---|
| Comparative Example 1-1 | In the method of Example 1, *Inonotus ibliquus* mycelia were inoculated alone in PDB, rather than co-inoculating the mycelia of three species of mushrooms, and the subsequent culturing process was the same |
| Comparative Example 1-2 | In the method of Example 1, *Ganoderma lucidum* mycelia were inoculated alone in PDB, rather than co-inoculating the mycelia of three species of mushrooms, and the subsequent culturing process was the same |
| Comparative Example 1-3 | In the method of Example 1, *Phellinus linteus* mycelia were inoculated alone in PDB, rather than co-inoculating the mycelia of three species of mushrooms, and the subsequent culturing process was the same |
| Comparative Example 1-4 | In the method of Example 1, the step of culturing PDB was omitted, the mycelia of three species of mushrooms were directly inoculated in a rice barley medium, and the culture period was further increased by the time corresponding to the step of culturing PDB |
| Comparative Example 1-5 | In the method of Example 1, the step of culturing PDB was performed, followed by re-inoculation in a fresh PDB medium and additional liquid culture for 30 days (culturing in a rice barley medium was omitted) |

Comparative Example 2. Preparation of Comparative Mycelia—ii

The co-cultured mycelia of *Inonotus obliquus*, *Phellinus linteus* and *Sparassis crispa* were prepared according to the method of Preparation Example 1 and Example 1 of Korean Patent No. 10-1652035.

Comparative Example 3. Preparation of Comparative Mycelia—iii

The co-cultured mycelia were prepared according to the method of Preparation Example 1 and Example 1 of Korean Patent No. 10-1652035 as in Comparative Example 2, with the exception that *Ganoderma lucidum* was used in lieu of *Sparassis crispa*.

Comparative Example 4. Preparation of Comparative Mycelia—iv

The co-cultured mycelia of *Inonotus obliquus*, *Ganoderma lucidum* and *Phellinus linteus* mycelia were prepared according to the method of Example 1 of Korean Patent No. 10-1358648.

Comparative Example 5. Preparation of Comparative Cured Meat—i

The cured meat was prepared in the same manner as in Example 2, with the exception that the co-cultured mycelia of Example 1, cumin powder, basil powder, dill weed powder, dill seed powder and salt were mixed under the conditions of Table 3 below.

TABLE 3

| Preparation conditions of cured meat | Weight (g) | | | | | | |
|---|---|---|---|---|---|---|---|
| | Pork fillet | Co-cultured mycelia of Example 1 | Cumin powder | Basil powder | Dill weed powder | Dill seed powder | Salt |
| Comparative Example 5-1 | 100 | 1.0 | 0.0 | 0.0 | 0.4 | 0.4 | 0.1 |
| Comparative Example 5-2 | 100 | 1.0 | 0.0 | 0.4 | 0.4 | 0.0 | 0.1 |
| Comparative Example 5-3 | 100 | 1.0 | 0.4 | 0.0 | 0.4 | 0.0 | 0.1 |
| Comparative Example 5-4 | 100 | 1.0 | 0.0 | 0.8 | 0.0 | 0.0 | 0.1 |
| Comparative Example 5-5 | 100 | 1.8 | 0.0 | 0.0 | 0.0 | 0.0 | 0.1 |

Comparative Example 6. Preparation of Comparative Cured Meat—ii

The cured meat was prepared in the same manner as in Example 2, with the exception that the mushroom mycelia C were used under the conditions of Table 4 below, in lieu of using the co-cultured mycelia of Example 1.

TABLE 4

| Preparation conditions of cured meat | Type of mushroom mycelia used for preparation of cured meat |
|---|---|
| Comparative Example 6-1 | Mushroom mycelia of Comparative Example 1-1 |
| Comparative Example 6-2 | Mushroom mycelia of Comparative Example 1-2 |
| Comparative Example 6-3 | Mushroom mycelia of Comparative Example 1-3 |
| Comparative Example 6-4 | Mushroom mycelia of Comparative Example 1-4 |
| Comparative Example 6-5 | Mushroom mycelia of Comparative Example 1-5 |
| Comparative Example 6-6 | Mushroom mycelia of Comparative Example 2 |
| Comparative Example 6-7 | Mushroom mycelia of Comparative Example 3 |
| Comparative Example 6-8 | Mushroom mycelia of Comparative Example 4 |

Comparative Example 7. Preparation of Comparative Cured Meat—iii

The cured meat was prepared in the same manner as in Example 2, with the exception that a curing composition and pork fillet were mixed and then allowed to stand in a low-temperature warehouse at 7° C. for 28 hr.

Experimental Example 1. Evaluation of Beta-Glucan Content

The beta-glucan content in the mushroom mycelia was evaluated by the Korea Institute of Analysis and Technology upon request. The results thereof are shown in Table 5 below. It was confirmed that the co-cultured mycelia obtained through the method of Example 1 had the highest beta-glucan content.

TABLE 5

| Conditions | Beta-glucan content (mg/g) |
|---|---|
| Example 1 | 196.1 |
| Comparative Example 1-1 | 100.6 |
| Comparative Example 1-2 | 102.3 |
| Comparative Example 1-3 | 102.5 |
| Comparative Example 1-4 | 112.4 |
| Comparative Example 1-5 | 124.4 |
| Comparative Example 2 | 149.2 |
| Comparative Example 3 | 131.4 |
| Comparative Example 4 | 136.2 |

Experimental Example 2. Sensory Evaluation of Food Using Mushroom Mycelial Powder as Cooking Seasoning 50 people of all ages and both genders were made to taste bean sprout soup seasoned with salt and various powdery mushroom mycelia, and the evaluation thereof was marked on a 5-point scale. Here, no seasonings other than the salt and the mushroom mycelial powder were added to the bean sprout soup, so only the effect of the mushroom mycelial powder on enhancing the taste was observed. Each soup was evaluated as 5 points (very good), 4 points (good), 3 points (normal), 2 points (slightly bad) or 1 point (bad), and the average value thereof is shown in Table 6 below.

As is apparent f rom the results of Table 6, it was confirmed that the preference for flavor and taste of bean sprout soup cooked with the co-cultured mycelial powder obtained through the method of Example 1 was the highest.

TABLE 6

| Conditions | Flavor | Savory taste | Delicate taste |
|---|---|---|---|
| Example 1 | 4.4 | 4.5 | 4.2 |
| Comparative Example 1-1 | 3.1 | 2.9 | 3.0 |
| Comparative Example 1-2 | 3.0 | 2.8 | 3.1 |
| Comparative Example 1-3 | 2.5 | 3.2 | 3.2 |
| Comparative Example 1-4 | 3.2 | 3.4 | 2.7 |
| Comparative Example 1-5 | 3.1 | 2.9 | 3.3 |
| Comparative Example 2 | 3.4 | 3.1 | 3.1 |
| Comparative Example 3 | 3.5 | 3.0 | 3.2 |
| Comparative Example 4 | 3.2 | 3.4 | 3.3 |

Experimental Example 3. Sensory Evaluation of Food Cooked with Cured Meat

The cured meat prepared in each of Example 2, Comparative Example 5 and Comparative Example 6 was coated with a batter made from Beksul frying powder and breadcrumbs and then fried.

For the meat fries thus prepared, sensory evaluation was performed using 100 people of ages 20-50 and both genders. Table 7 below shows the results according to a 5-point scale (5 points: very good, 4 points: good, 3 points: normal, 2 points: slightly bad, 1 point: very bad).

TABLE 7

| Conditions | Flavor | Chewiness | Softness | Delicate taste |
|---|---|---|---|---|
| Example 2-1 | 4.4 | 4.1 | 4.2 | 4.0 |
| Example 2-2 | 4.2 | 4.2 | 4.3 | 4.1 |
| Example 3-3 | 4.0 | 4.4 | 4.1 | 4.3 |
| Example 2-4 | 4.1 | 4.2 | 4.0 | 4.2 |
| Comparative Example 5-1 | 2.6 | 4.3 | 4.1 | 3.4 |
| Comparative Example 5-2 | 3.1 | 4.2 | 4.2 | 3.3 |
| Comparative Example 5-3 | 3.1 | 4.1 | 4.2 | 3.6 |
| Comparative Example 5-4 | 2.5 | 4.4 | 4.3 | 2.2 |
| Comparative Example 5-5 | 1.9 | 4.3 | 4.2 | 2.2 |
| Comparative Example 6-1 | 2.9 | 2.7 | 2.7 | 3.2 |
| Comparative Example 6-2 | 2.5 | 3.2 | 2.8 | 2.9 |
| Comparative Example 6-3 | 2.9 | 3.0 | 2.8 | 3.2 |
| Comparative Example 6-4 | 2.8 | 3.2 | 3.1 | 2.8 |
| Comparative Example 6-5 | 2.8 | 2.7 | 3.2 | 3.1 |
| Comparative Example 6-6 | 3.0 | 3.2 | 3.0 | 3.3 |
| Comparative Example 6-7 | 2.2 | 3.3 | 3.2 | 3.5 |
| Comparative Example 6-8 | 2.2 | 3.2 | 3.0 | 2.8 |
| Comparative Example 7 | 2.1 | 2.9 | 2.9 | 2.5 |

As is apparent from the results of Table 7, the meat fries prepared from the raw meat cured with the co-cultured mycelia obtained through the method of the present invention exhibited the highest scores in flavor, chewiness, softness and delicate taste. Meanwhile, the cumin powder, basil powder, dill weed powder, and dill seed powder contained in the curing composition are very effective at removing the odor of meat, but the scent thereof is strong, so they may be rejected by those who ingest them, but the strong scent thereof was deemed to be alleviated because the co-cultured mycelia of the present invention was used therewith in the curing process.

Experimental Example 4. Evaluation of Low-Temperature Storage Period of Cured Meat The cured meat prepared in Example 2 and Comparative Example 6 was stored at 2° C. for a long period of time, and the storage stability in the cured state was compared on the $3^{rd}$ day, $7^{th}$ day, and $14^{th}$ day. In Table 8 below, a good state is indicated by ⊚ and decay initiation or progression is indicated by x. With reference to Table 8, it was confirmed that only the cured meat of Examples 2-1 to 2-4, cured with the co-cultured mycelia obtained through the method of the present invention, exhibited good low-temperature storage stability until the $14^{th}$ day.

TABLE 8

| Conditions | $3^{rd}$ day | $7^{th}$ day | $14^{th}$ day |
|---|---|---|---|
| Example 2-1 | ⊚ | ⊚ | ⊚ |
| Example 2-2 | ⊚ | ⊚ | ⊚ |
| Example 2-3 | ⊚ | ⊚ | ⊚ |
| Example 2-4 | ⊚ | ⊚ | ⊚ |
| Comparative Example 6-1 | ⊚ | X | X |
| Comparative Example 6-2 | ⊚ | X | X |
| Comperative Example 6-3 | ⊚ | X | X |
| Comparative Example 6-4 | ⊚ | X | X |
| Comparative Example 6-5 | ⊚ | X | X |
| Comparative Example 6-6 | ⊚ | ⊚ | X |
| Comparative Example 6-7 | ⊚ | ⊚ | X |
| Comparative Example 6-8 | ⊚ | ⊚ | X |

The invention claimed is:

1. A method of co-culturing *Inonotus obliquus*, *Ganoderma lucidum* and *Phellinus linteus* mycelia, comprising the following steps in order:
   (1) inoculating a fruit body tissue of each of *Inonotus obliquus*, *Gano derma lucidum* and *Phellinus linteus* in Potato Dextrose Agar (PDA) and then separately culturing mycelia of each of the *Inonotus obliquus*, *Gano derma lucidum* and *Phellinus linteus*;
   (2) co-inoculating the mycelia of the *Inonotus obliquus*, *Ganoderma lucidum* and *Phellinus linteus* separately cultured in the step (1) in Potato Dextrose Broth (PDB);
   (3) culturing the PDB inoculated with the mycelia of the *Inonotus obliquus*, *Ganoderma lucidum* and *Phellinus linteus* for 4-6 weeks;
   (4) inoculating the mycelia obtained through the culturing in the step (3) in a rice barley medium; and
   (5) further culturing the mycelia inoculated in the rice barley medium in the step (4) for 4-7 weeks to obtain co-cultured mycelia.

2. The method of claim 1, wherein the culturing the mycelia in the step (3) is performed at 25-30° C.

3. The method of claim 1, wherein the rice barley medium in the step (4) is obtained by subjecting rice barley to soaking for 4-8 hr and then dehydration, adding calcium carbonate in an amount of 0.5-2 parts by weight based on 100 parts by weight of the dehydrated rice barley, and then performing sterilization at 120-125° C. for 30 min to 2 hr.

4. The method of claim 1, wherein the culturing in the step (5) is performed at 25-30° C.

5. A method of curing raw meat using co-cultured mycelia of *Inonotus obliquus*, *Ganoderma lucidum* and *Phellinus linteus*, comprising:
   obtaining co-cultured mycelia through the method of claim 1; and
   finely cutting the co-cultured mycelia isolated from a rice barley medium, adding meat with the finely cut co-cultured mycelia, a cumin powder, a basil powder, a dill weed powder, a dill seed powder, and a salt, and performing curing.

6. Co-cultured mycelia obtained through the method of claim 1.

7. A food additive comprising the co-cultured mycelia of claim 6.

8. A curing-agent composition for meat containing the co-cultured mycelia of claim 6, a cumin powder, a basil powder, a dill weed powder, a dill seed powder, and a salt.

* * * * *